United States Patent
Jeong et al.

(10) Patent No.: US 12,492,192 B2
(45) Date of Patent: Dec. 9, 2025

(54) CRYSTALLINE FORM OF LIFITEGRAST, AND PHARMACEUTICAL COMPOSITION COMPRISING THE SAME

(71) Applicant: YS LIFE SCIENCE CO. LTD., Seoul (KR)

(72) Inventors: Eunim Jeong, Suwon-si (KR); Areum Baek, Suwon-si (KR); Hyunik Shin, Suwon-si (KR)

(73) Assignee: YS LIFE SCIENCE CO. LTD., Seoul (KR)

( * ) Notice: Subject to any disclaimer, the term of this patent is extended or adjusted under 35 U.S.C. 154(b) by 431 days.

(21) Appl. No.: 18/031,986

(22) PCT Filed: Oct. 14, 2021

(86) PCT No.: PCT/KR2021/014225
§ 371 (c)(1),
(2) Date: Apr. 14, 2023

(87) PCT Pub. No.: WO2022/080887
PCT Pub. Date: Apr. 21, 2022

(65) Prior Publication Data
US 2023/0382897 A1    Nov. 30, 2023

(30) Foreign Application Priority Data
Oct. 15, 2020   (KR) ........................ 10-2020-0133451

(51) Int. Cl.
C07D 405/06    (2006.01)

(52) U.S. Cl.
CPC ........ *C07D 405/06* (2013.01); *C07B 2200/13* (2013.01)

(58) Field of Classification Search
None
See application file for complete search history.

(56) References Cited

U.S. PATENT DOCUMENTS

| | | |
|---|---|---|
| 8,367,701 B2 | 2/2013 | Burnier et al. |
| 10,435,395 B1 | 10/2019 | Lin et al. |
| 2017/0029410 A1 | 2/2017 | Burnier |
| 2019/0300512 A1 | 10/2019 | Lin et al. |

FOREIGN PATENT DOCUMENTS

| | | |
|---|---|---|
| CN | 111205275 A | 5/2020 |
| IN | 201811030659 A | 8/2020 |
| KR | 10-2020-0068663 A | 6/2020 |

OTHER PUBLICATIONS

International Search Report for PCT/KR2021/014225 dated, Jan. 24, 2022 (PCT/ISA/210).

*Primary Examiner* — Sarah Pihonak
*Assistant Examiner* — Donna M Nestor
(74) *Attorney, Agent, or Firm* — Sughrue Mion, PLLC

(57) ABSTRACT

Provided is a novel crystalline form of lifitegrast and a pharmaceutical composition containing the novel crystalline form of lifitegrast. The crystalline form of lifitegrast has improved solubility and excellent stability against heat and moisture, thereby being effectively used for preparing a pharmaceutical composition.

12 Claims, 14 Drawing Sheets

[Figure 1]
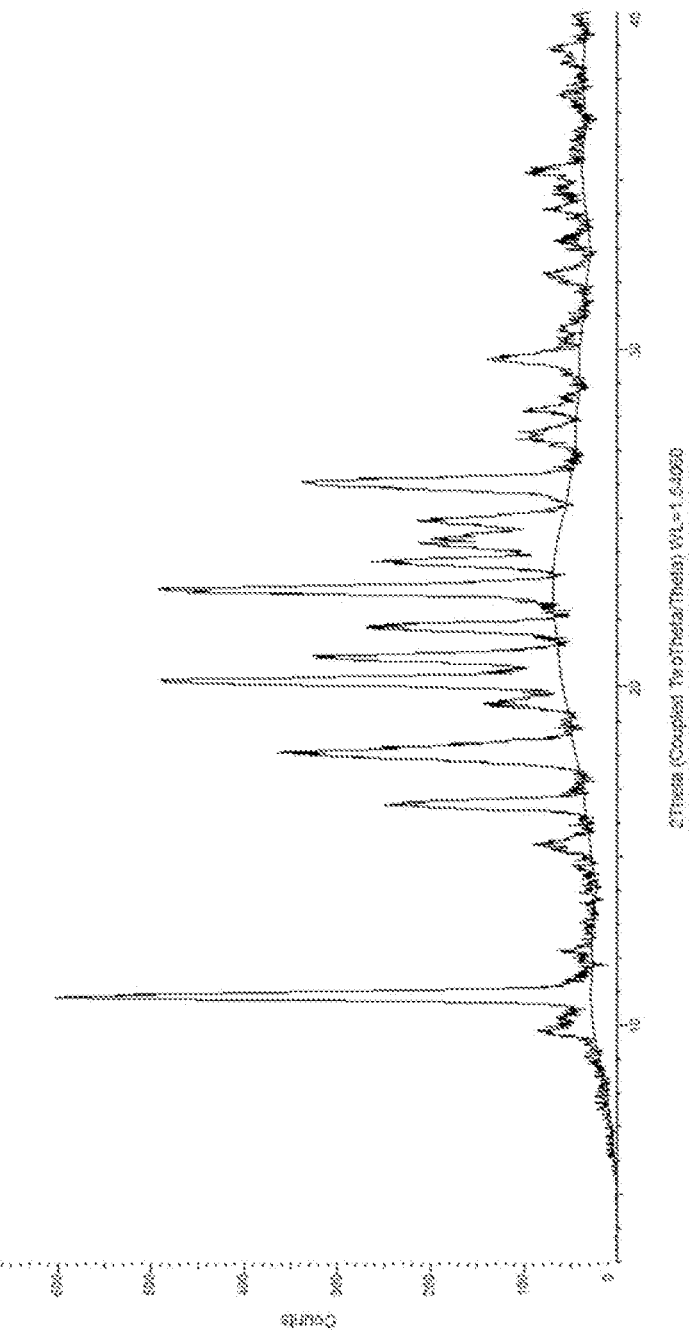

[Figure 2]
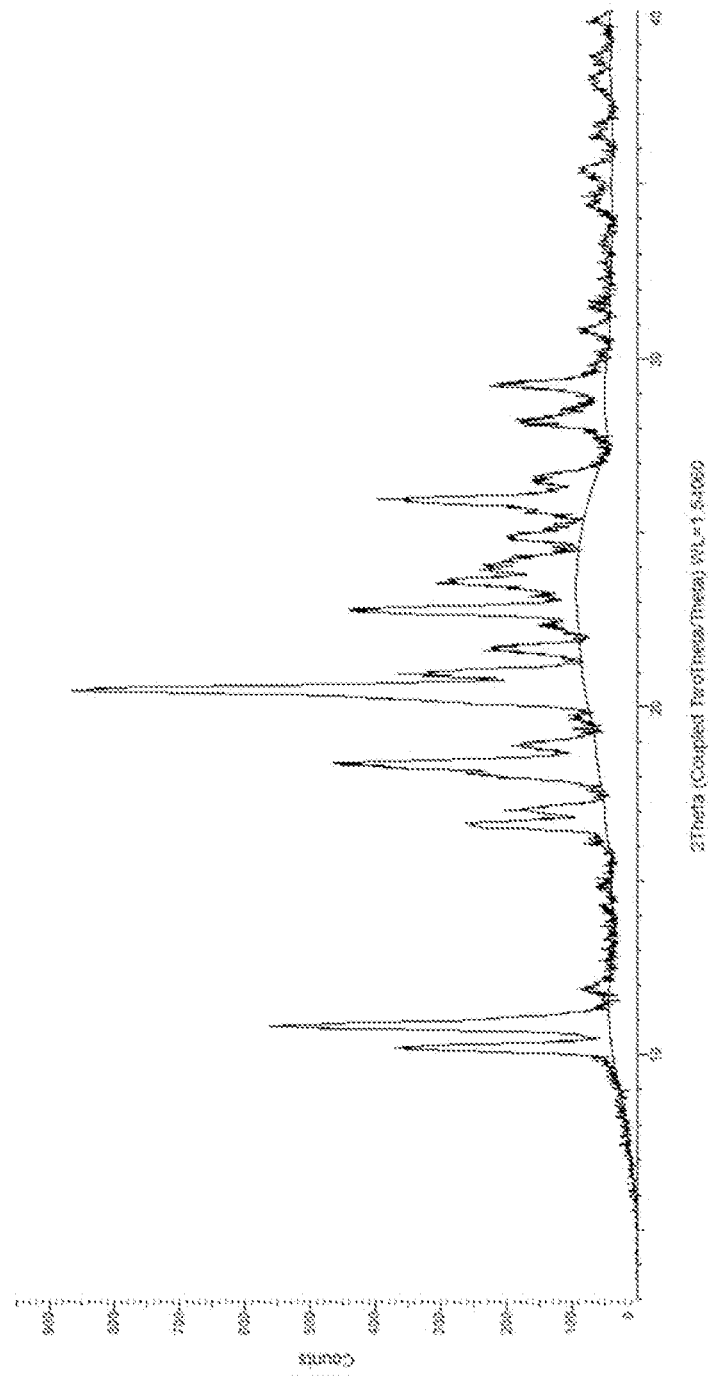

[Figure 3]
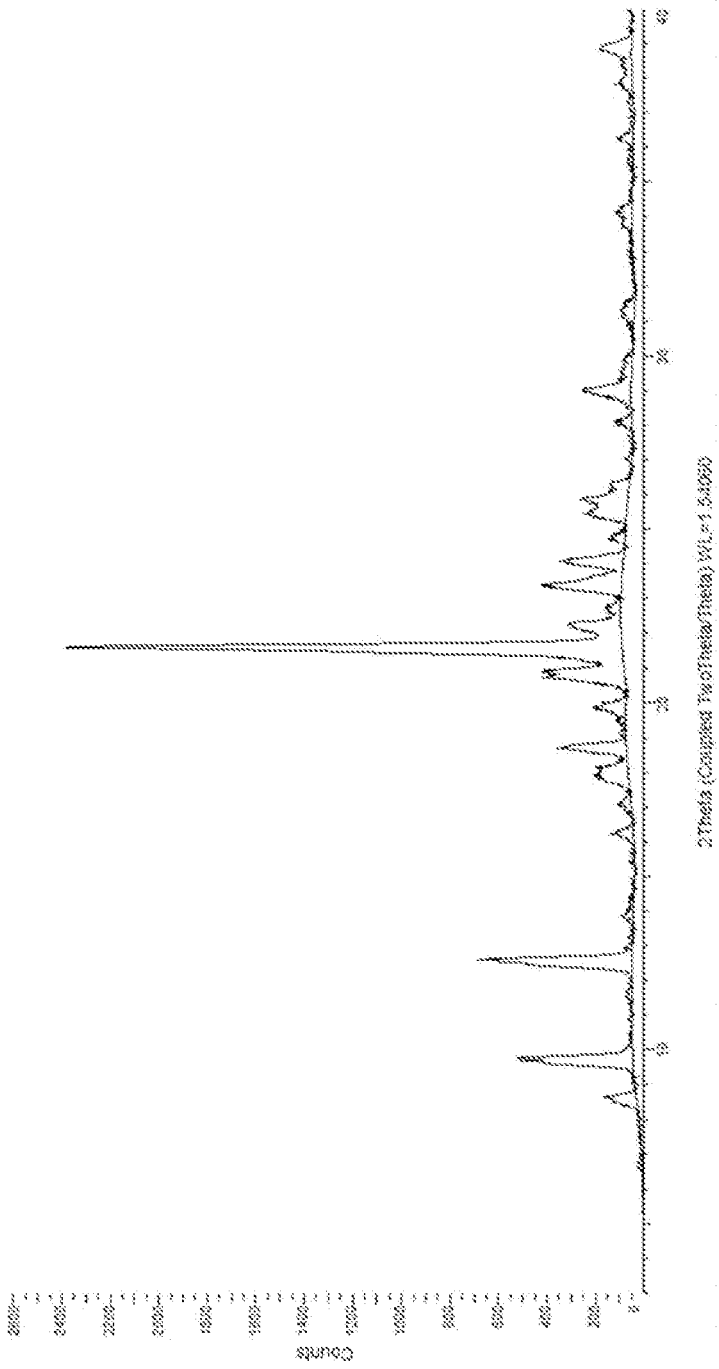

[Figure 4]
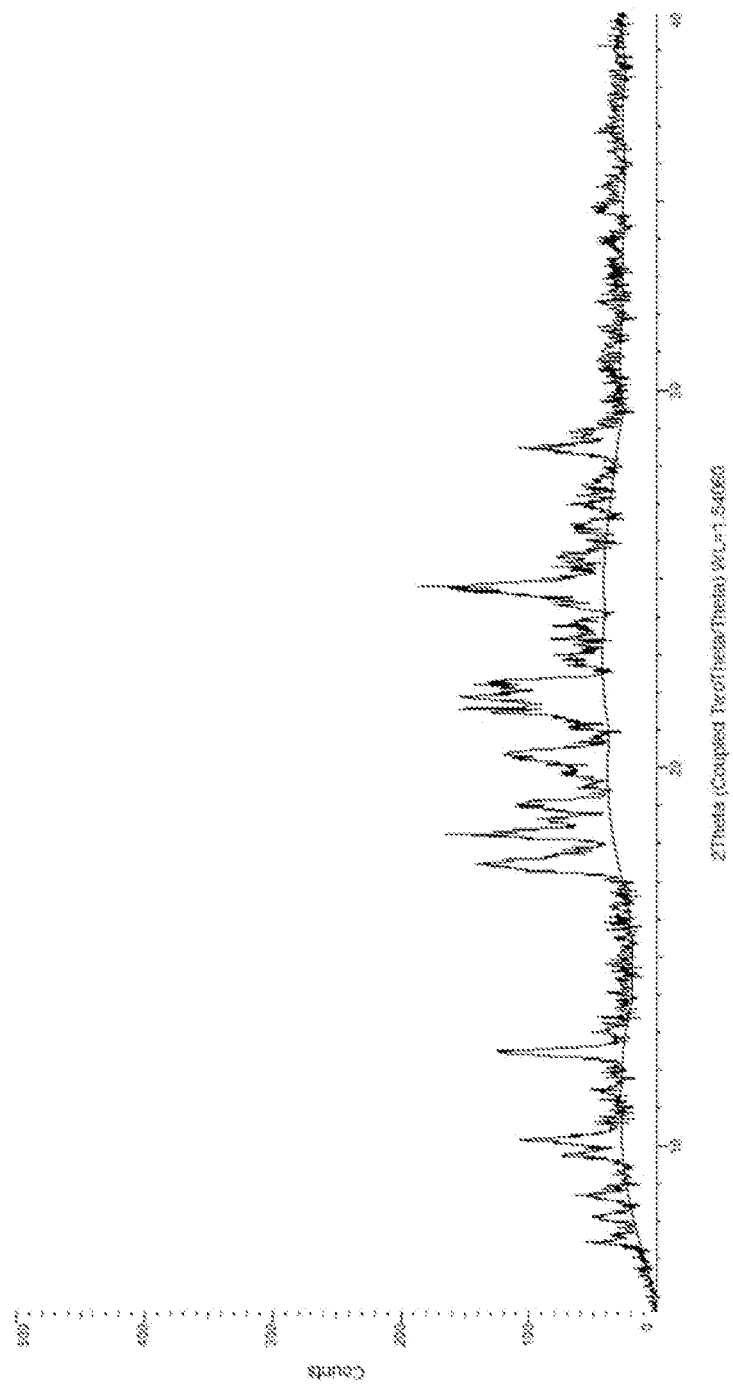

[Figure 5]
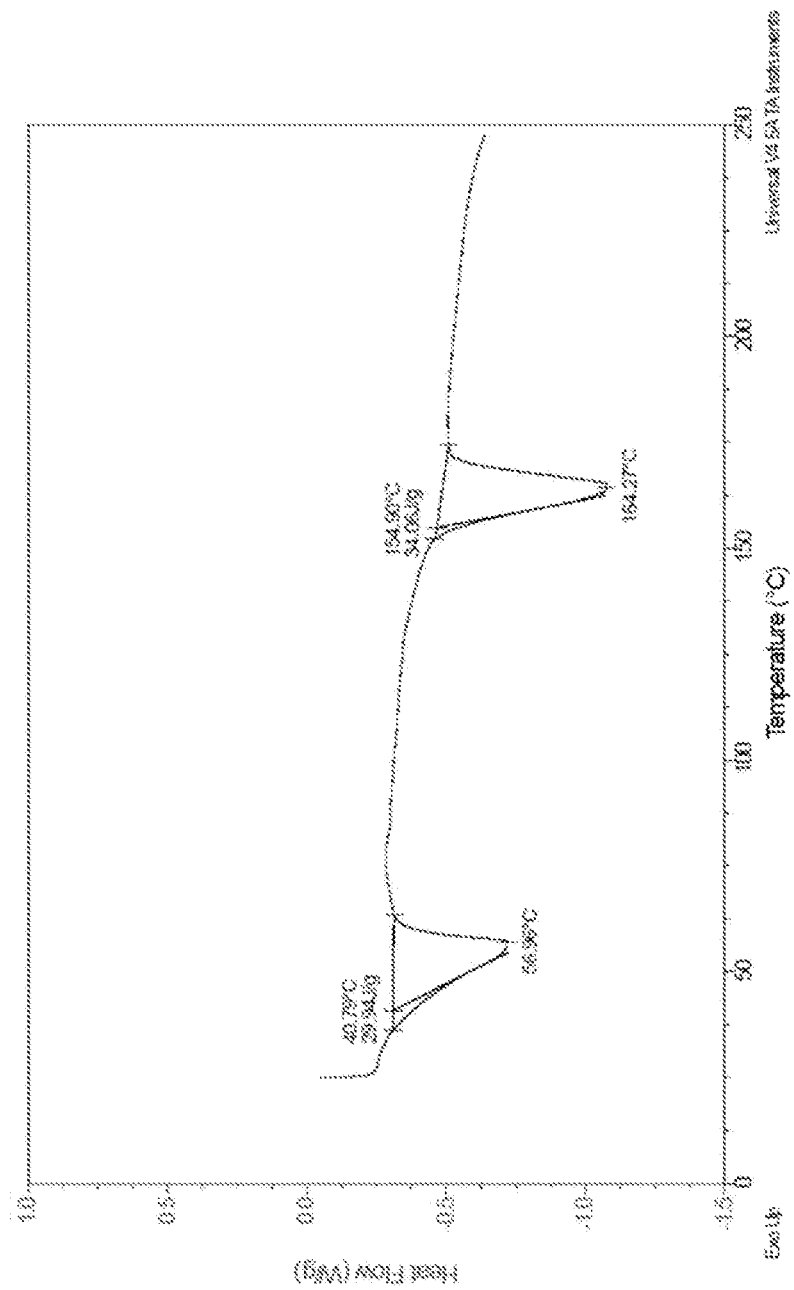

[Figure 6]
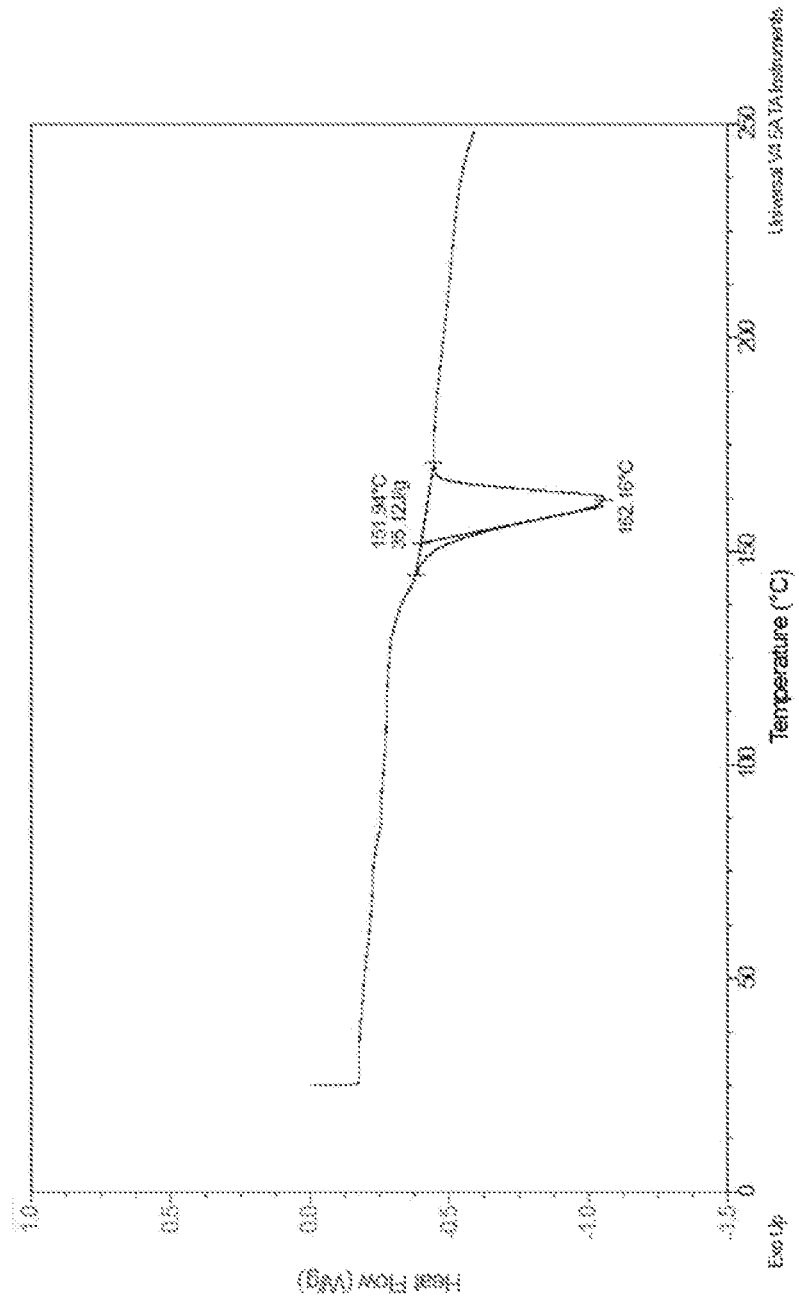

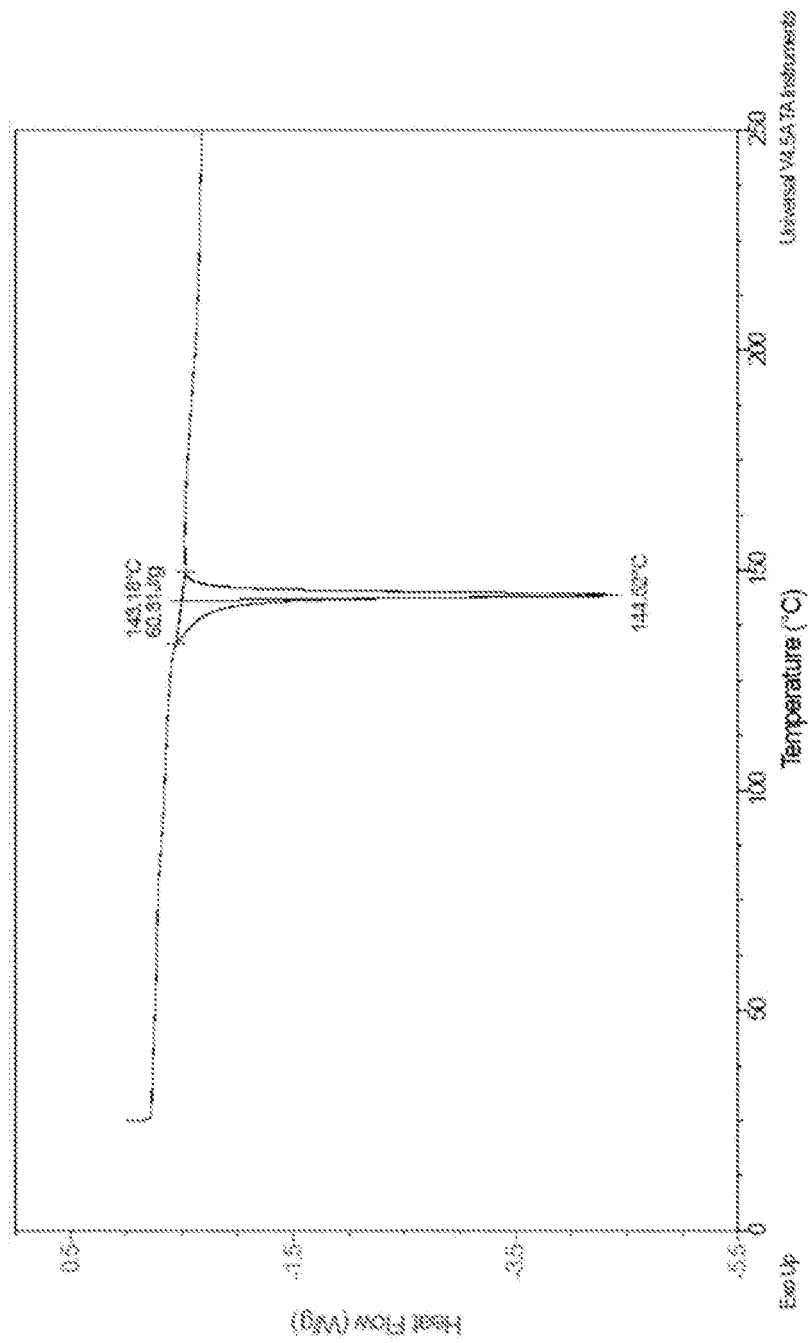
[Figure 7]

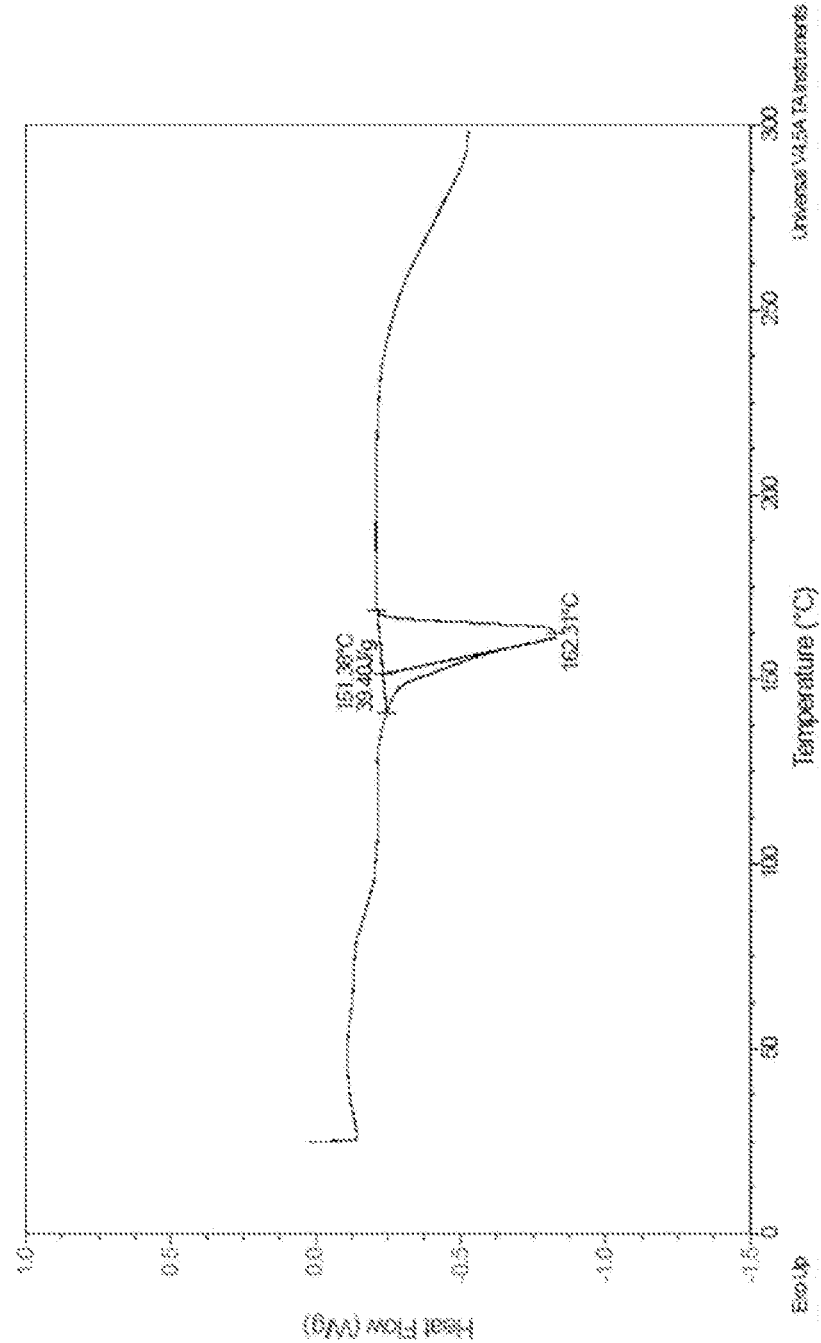
[Figure 8]

[Figure 9]
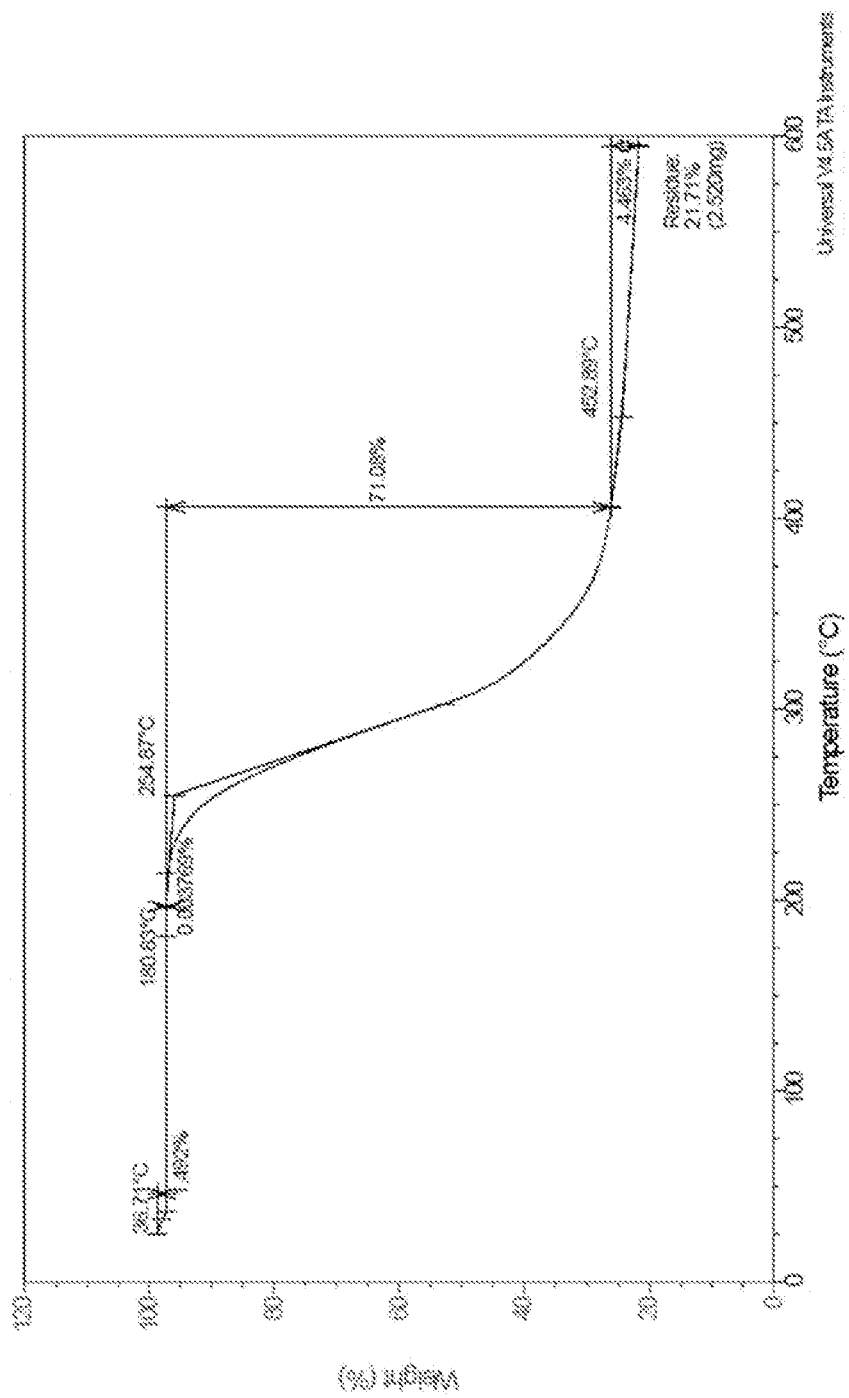

[Figure 10]
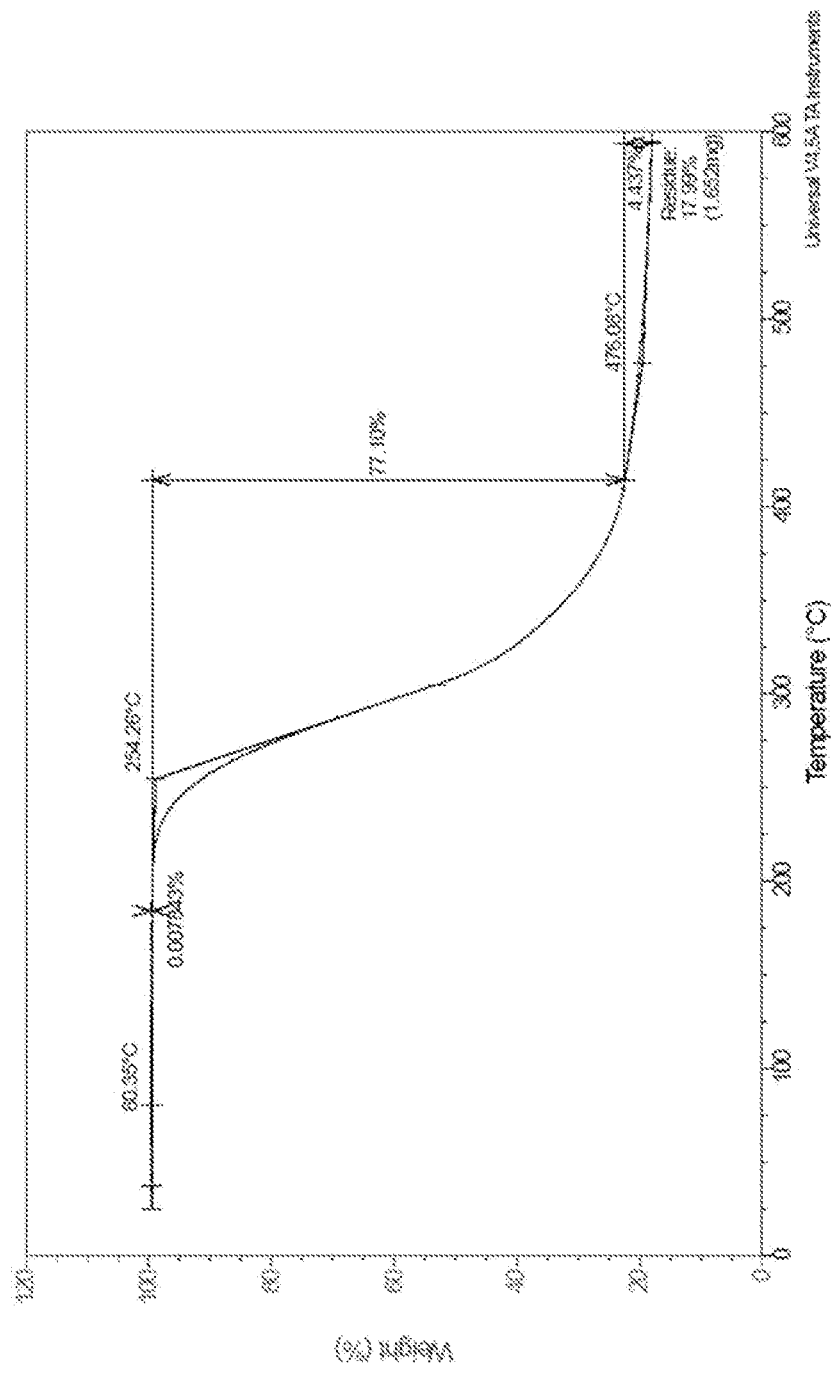

[Figure 11]
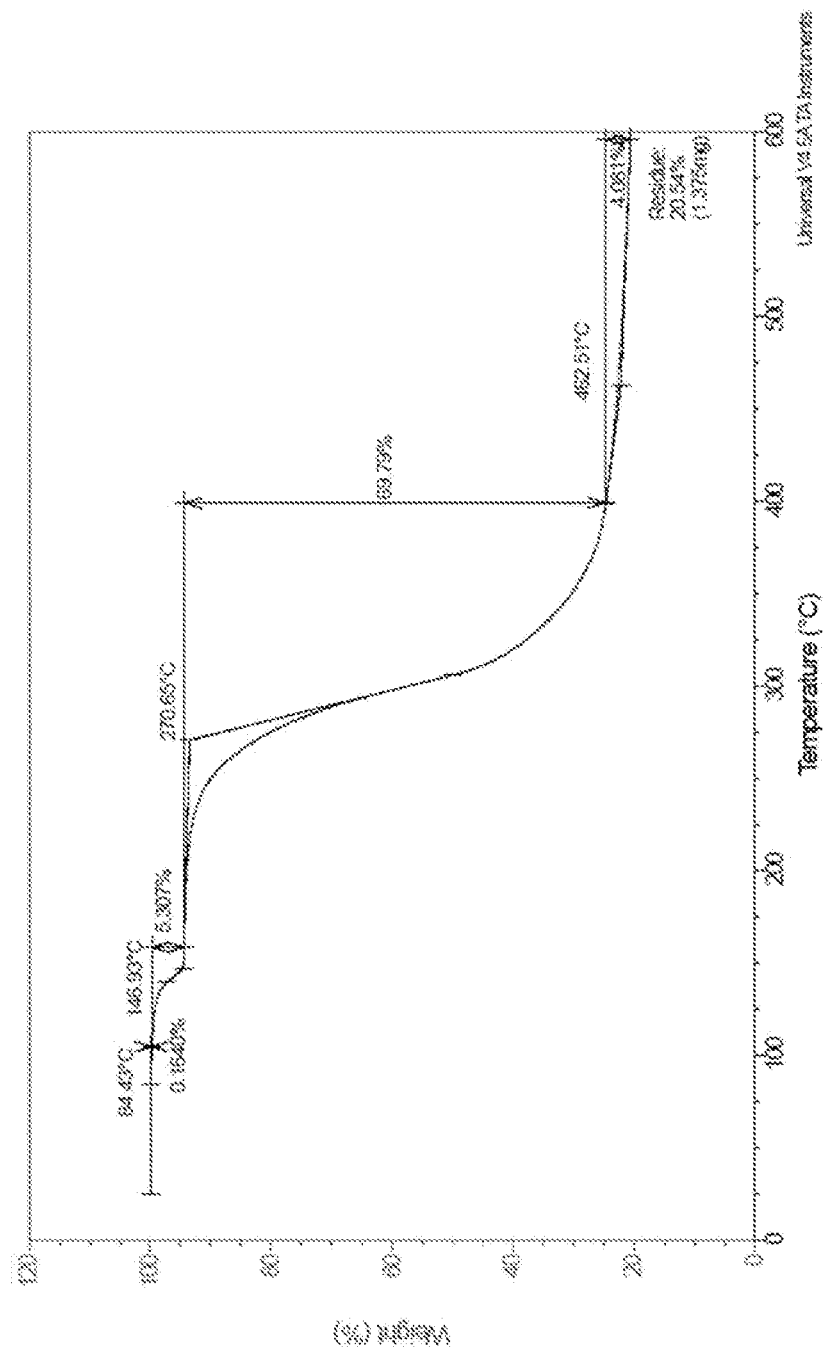

[Figure 12]
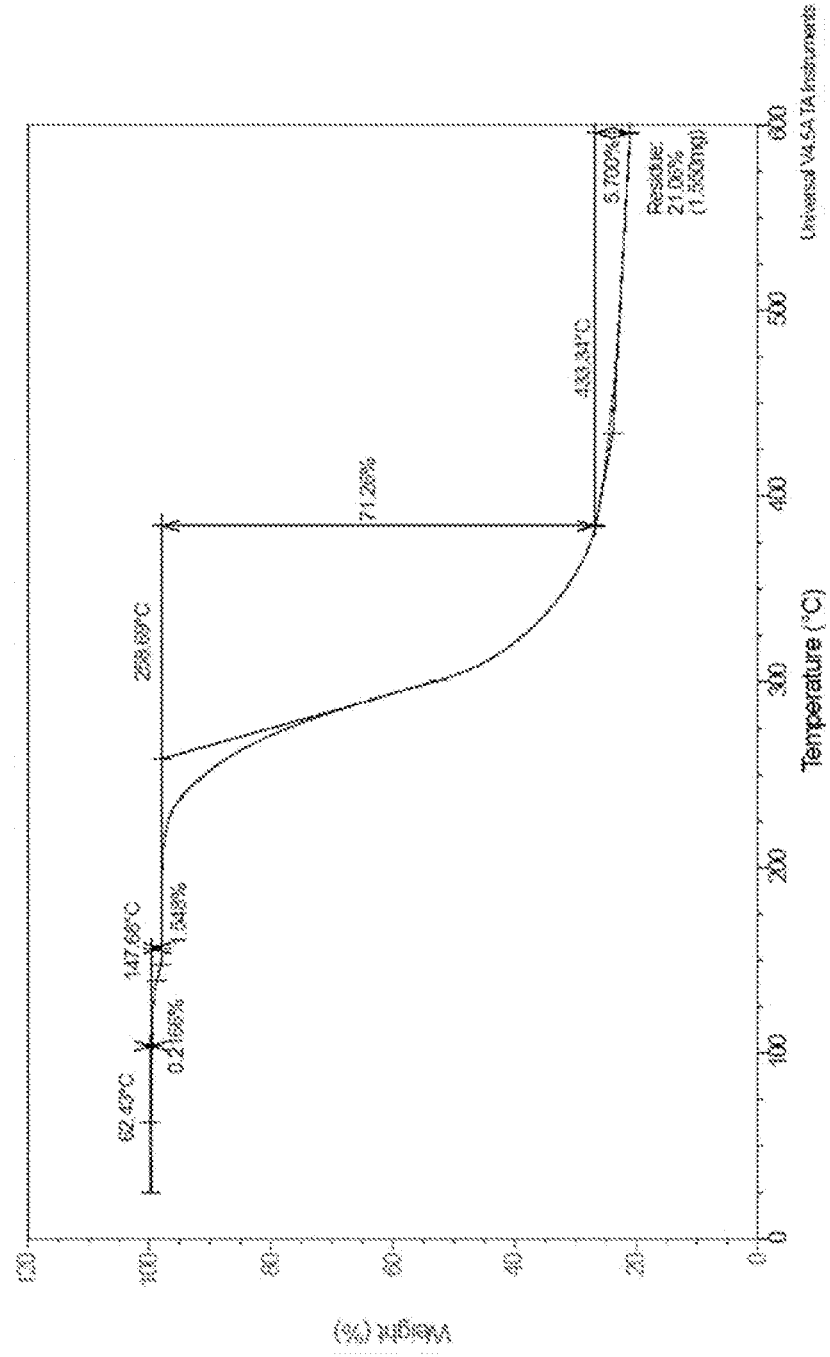

[Figure 13]
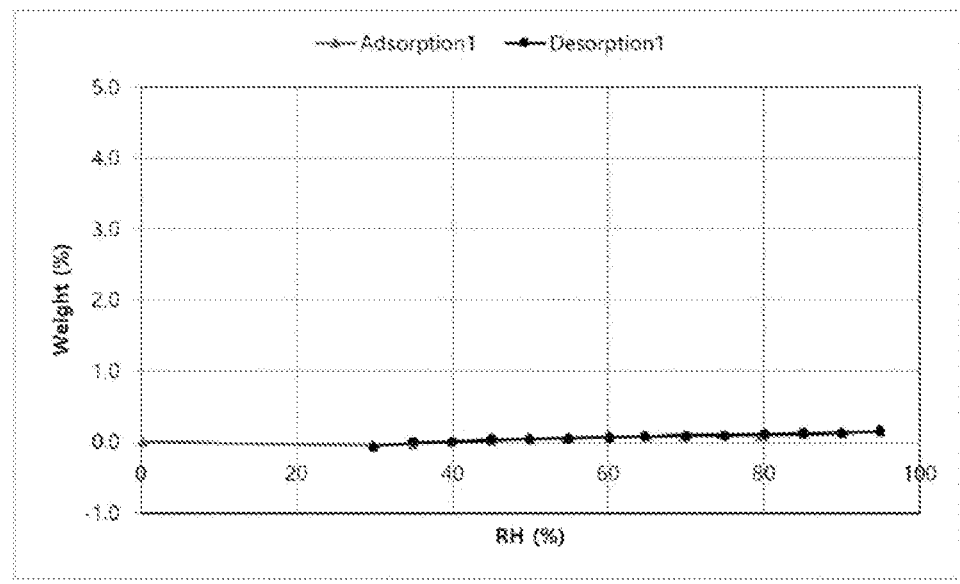
[Figure 14]
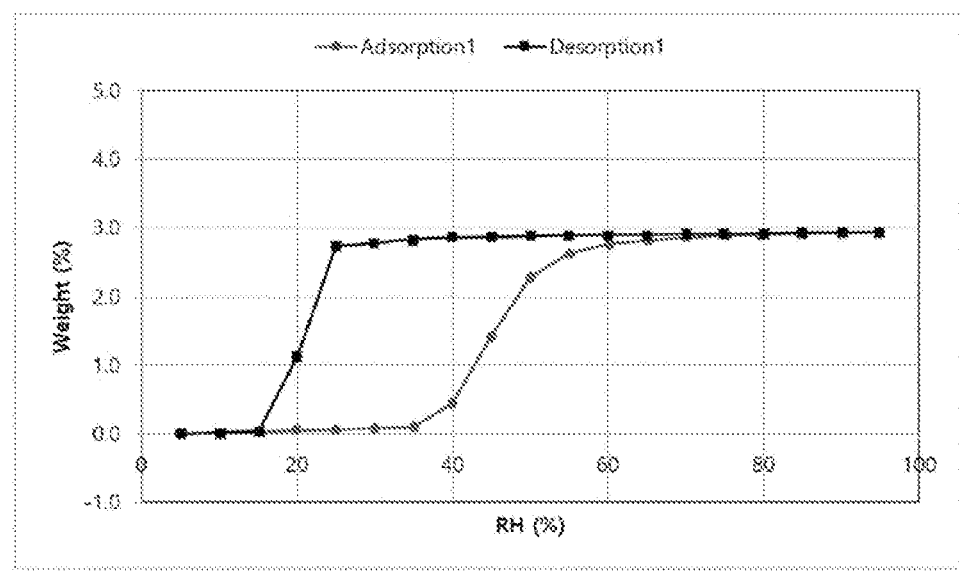

[Figure 15]
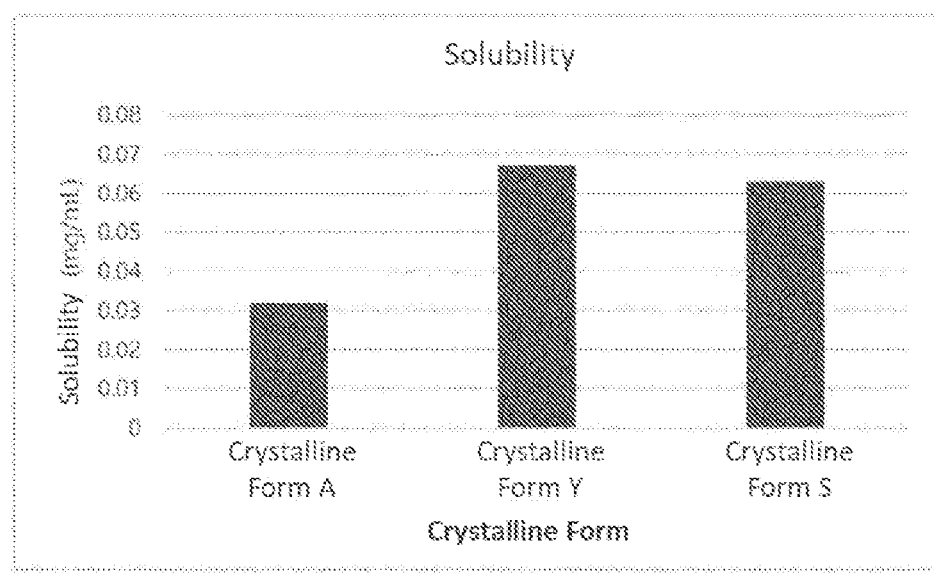

CRYSTALLINE FORM OF LIFITEGRAST, AND PHARMACEUTICAL COMPOSITION COMPRISING THE SAME

CROSS REFERENCE TO RELATED APPLICATIONS

This application is a National Stage of International Application No. PCT/KR2021/014225 filed Oct. 14, 2021, claiming priority based on Korean Patent Application No. 10-2020-0133451 filed Oct. 15, 2020.

TECHNICAL FIELD

The present invention relates to a lifitegrast crystalline form and a pharmaceutical composition comprising the same. More particularly, the present invention relates to a crystalline form of lifitegrast which has improved solubility and excellent stability against heat and moisture, and a pharmaceutical composition comprising the same.

BACKGROUND ART

Dry eye syndrome is a disease caused by insufficient production of tears in the eye or excessive evaporation of tears. The tear layer consists of a lipid layer, an aqueous layer, and a mucus layer. Each of these enables to prevent tear evaporation, hydrate, and retain tears in the eye. When the tear layer is externally stimulated, or a change of the ingredients in each layer occurs due to other factors, dry eye syndrome can occur. When dry eye syndrome occurs, tears become dry or do not flow, causing a feeling of foreign body sensation in the eye and making the eye surface easily damaged and irritated. People suffered from dry eye sydrome easily get bloodshot and feel tired due to the foreign body sensation or irritation, and in severe cases, headaches may occur. In the case of modern people, dry eye syndrome occurs frequently due to exposure to various digital devices which can easily induce dry eye syndrome. Further, the incidence of dry eye syndrome is a growing trend due to the side effects of drugs, aging, wearing lens or the like.

For the treatment of dry eye syndrome, artificial tears containing lifitegrast as a main ingredient are used.

Lifitegrast of the following formula (I) is an active ingredient of XIIDRA® eye drop which is a medicine for treating dry eye syndrome developed by Shire, was released after receiving approval from the US Food and Drug Administration in July 2016, and is currently sold as a disposable eye drop storable at room temperature.

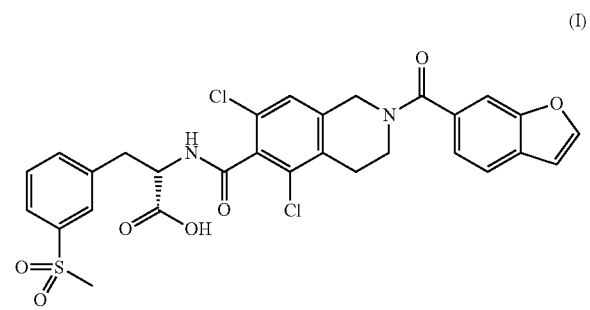

(I)

The lifitegrast and its crystalline form are disclosed in U.S. Pat. Nos. 8,367,701 and 10,435,395.

However, the lifitegrast and its crystalline form have problems that they are not easy to formulate due to low solubility in water and bioavailability is low.

Additionally, there is a need to research on a novel crystalline form of lifitegrast with excellent stability against heat and moisture.

DISCLOSURE

Technical Problem

An object of the present invention is to provide a crystalline form of lifitegrast which has improved solubility and excellent stability against heat and moisture.

Another object of the present invention is to provide a pharmaceutical composition comprising the crystalline form of lifitegrast as an active ingredient.

Technical Solution

One embodiment of the present invention relates to crystalline form S of lifitegrast represented by the following formula (I) showing an X-ray powder diffraction (XRPD) pattern characterized by peaks having $I/I_o$ values of at least 10% (I is the intensity of each peak; $I_o$ is the intensity of the highest peak) at diffraction angles (2θ) of 9.8±0.2, 10.9±0.2, 16.5±0.2, 18.0±0.2, 19.5±0.2, 20.2±0.2, 20.9±0.2, 21.8±0.2, 22.9±0.2, 23.7±0.2, 24.3±0.2, 24.4±0.2, 24.9±0.2, 26.0±0.2, and 29.7±0.2.

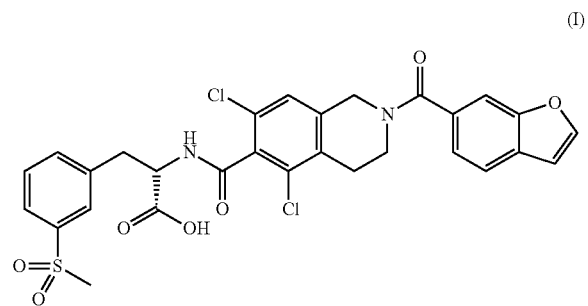

(I)

The crystalline form S of lifitegrast according to an embodiment of the present invention may further have XRPD peaks of weak intensity at diffraction angles (2θ) of 12.2±0.2, 15.4±0.2, 28.2±0.2, 30.6±0.2, 32.2±0.2, 34.2±0.2, 34.8±0.2, 35.3±0.2, and 38.9±0.2 other than the above XRPD peaks. At this time, the "weak intensity" indicates a peak in which $I/I_o$ (relative intensity) is less than 10%.

The crystalline form S of lifitegrast according to an embodiment of the present invention shows a first endothermic peak at 57.0° C. and a second endothermic peak at 164.3° C. in differential scanning calorimetry.

The crystalline form S of lifitegrast according to an embodiment of the present invention may be prepared by suspending amorphous lifitegrast in ethanol, stirring with heating or stirring at room temperature, and then filtering, or storing crystalline form Y of lifitegrast at 25° C. and a relative humidity of 60%. The storage may be carried out for 12 hours or more.

Further, the crystalline form S of lifitegrast according to an embodiment of the present invention may be prepared from lifitegrast dissolved in an organic solvent.

Specifically, it may be prepared by adding ethanol to lifitegrast dissolved in an organic solvent and azeotroping to replace the solvent, stirring with heating or stirring at room temperature, and then filtering and drying under reduced pressure. At this time, Examples of the organic solvent which can be used to dissolve lifitegrast include water; aliphatic solvents such as pentane, petroleum ether, and hexane; aromatic solvents such as toluene and xylene; halogenated solvents such as dichloromethane; aliphatic ketones such as butanone and acetone; aliphatic esters such as ethyl acetate, isopropyl acetate, and butyl acetate; aliphatic ethers such as diethyl ether, tert-butyl methyl ether (TBME), and tetrahydrofuran; aromatic ethers; nitriles such as acetonitrile; alkenes; alkynes; alkenyl esters; and alkynyl esters. Among these organic solvents, dichloromethane, ethyl acetate, butanone and/or tetrahydrofuran are preferred, and dichloromethane is most preferred.

Further, ethanol used as a recrystallization solvent may be used by mixing with the organic solvent described above. The ratio of the organic solvent/ethanol is approximately 10/90, 20/80, 30/70, 40/60/, 50/50, 60/40, 70/30, 80/20, or 90/10, and all amounts include "approximately".

Another embodiment of the present invention relates to crystalline form Y of lifitegrast showing an X-ray powder diffraction (XRPD) pattern characterized by peaks having $I/I_o$ values of at least 10% (I is the intensity of each peak; $I_o$ is the intensity of the highest peak) at diffraction angles (2θ) of 10.2±0.2, 10.8±0.2, 16.6±0.2, 17.1±0.2, 18.1±0.2, 18.4±0.2, 18.9±0.2, 20.3±0.2, 20.5±0.2, 21.0±0.2, 21.6±0.2, 22.8±0.2, 23.6±0.2, 24.0±0.2, 24.9±0.2, 25.9±0.2, 26.5±0.2, 28.2±0.2, and 29.3±0.2.

The crystalline form Y of lifitegrast according to an embodiment of the present invention may further have XRPD peaks of weak intensity at diffraction angles (2θ) of 11.9±0.2, 16.1±0.2, 22.4±0.2, 30.8±0.2, 31.5±0.2, 34.4±0.2, 35.4±0.2, 36.4±0.2, 36.5±0.2, and 39.7±0.2 other than the above XRPD peaks.

The crystalline form Y of lifitegrast according to an embodiment of the present invention shows an endothermic peak at 162.2° C. in differential scanning calorimetry.

The crystalline form Y of lifitegrast according to an embodiment of the present invention may be prepared by suspending amorphous lifitegrast in ethanol, stirring with heating or stirring at room temperature, and then filtering and drying under reduced pressure.

Further, the crystalline form Y of lifitegrast according to an embodiment of the present invention may be prepared from an ethylene glycol solvate of lifitegrast.

Specifically, the crystalline form Y of lifitegrast may be prepared by suspending an ethylene glycol solvate of lifitegrast in a suspension solvent, stirring at room temperature, and then filtering and drying under reduced pressure or drying in an oven at 60 to 80° C. At this time, as the suspension solvent, water, ethanol, acetone, etc. may be used, and water is particularly preferred.

Further, the crystalline form Y of lifitegrast according to an embodiment of the present invention may be prepared from lifitegrast dissolved in an organic solvent.

Specifically, it may be prepared by adding ethanol to lifitegrast dissolved in an organic solvent and azeotroping to replace the solvent, stirring with heating or stirring at room temperature, and then filtering and drying under reduced pressure. At this time, Examples of the organic solvent which can be used to dissolve lifitegrast include water; aliphatic solvents such as pentane, petroleum ether, and hexane; aromatic solvents such as toluene and xylene; halogenated solvents such as dichloromethane; aliphatic ketones such as butanone and acetone; aliphatic esters such as ethyl acetate, isopropyl acetate, and butyl acetate; aliphatic ethers such as diethyl ether, tert-butyl methyl ether (TBME), and tetrahydrofuran; aromatic ethers; nitriles such as acetonitrile; alkenes; alkynes; alkenyl esters; and alkynyl esters. Among these organic solvents, dichloromethane, ethyl acetate, butanone and/or tetrahydrofuran are preferred, and dichloromethane is most preferred.

Further, ethanol used as a recrystallization solvent may be used by mixing with the organic solvent described above. The ratio of the organic solvent/ethanol is approximately 10/90, 20/80, 30/70, 40/60/, 50/50, 60/40, 70/30, 80/20, or 90/10, and all amounts include "approximately".

Still another embodiment of the present invention relates to an ethylene glycol solvate of lifitegrast showing an X-ray powder diffraction (XRPD) pattern characterized by peaks having $I/I_o$ values of at least 10% (I is the intensity of each peak; To is the intensity of the highest peak) at diffraction angles (2θ) of 9.7±0.2, 12.6±0.2, 18.7±0.2, 20.8±0.2, 21.6±0.2, 23.4±0.2, and 24.1±0.2.

The ethylene glycol solvate of lifitegrast according to an embodiment of the present invention may further have XRPD peaks of weak intensity at diffraction angles (2θ) of 6.7±0.2, 8.6±0.2, 11.6±0.2, 13.9±0.2, 16.2±0.2 17.1±0.2, 17.9±0.2, 18.0±0.2, 19.9±0.2, 22.2±0.2, 22.7±0.2, 24.8±0.2, 25.5±0.2, 25.8±0.2, 26.2±0.2, 27.0±0.2, 28.1±0.2, 29.0±0.2, 34.1±0.2, 35.6±0.2, 36.3±0.2, 37.9±0.2, and 38.9±0.2 other than the above XRPD peaks.

The ethylene glycol solvate of lifitegrast according to an embodiment of the present invention shows an endothermic peak at 144.5° C. in differential scanning calorimetry.

The ethylene glycol solvate of lifitegrast according to an embodiment of the present invention may be prepared by suspending amorphous lifitegrast in ethylene glycol, stirring with heating or stirring at room temperature, and then filtering and drying under reduced pressure.

Still another embodiment of the present invention relates to crystalline form Z of lifitegrast showing an X-ray powder diffraction (XRPD) pattern characterized by peaks having $I/I_o$ values of at least 10% (I is the intensity of each peak; $I_o$ is the intensity of the highest peak) at diffraction angles (2θ) of 7.5±0.2, 8.1±0.2, 8.7±0.2, 9.8±0.2, 10.2±0.2, 12.5±0.2, 17.5±0.2, 18.3±0.2, 18.6±0.2, 19.0±0.2, 20.3±0.2, 21.1±0.2, 21.5±0.2, 21.9±0.2, 22.2±0.2, 22.9±0.2, 23.8±0.2, 24.3±0.2, 24.8±0.2, 25.6±0.2, 26.4±0.2, 27.0±0.2, 28.5±0.2, and 34.8±0.2.

The crystalline form Z of lifitegrast according to an embodiment of the present invention shows an endothermic peak at 162.3° C. in differential scanning calorimetry.

The crystalline form Z of lifitegrast according to an embodiment of the present invention may be prepared by suspending amorphous lifitegrast in a suspension solvent, heating for dissolving or stirring at room temperature followed by cooling, and then filtering and drying under reduced pressure. At this time, as the suspension solvent, ethylene glycol dimethyl ether, 1,2-dimethoxyethane, propionitrile, etc. may be used, and ethylene glycol dimethyl ether is particularly preferred.

Further, the crystalline form Z of lifitegrast according to an embodiment of the present invention may be prepared from an ethylene glycol solvate of lifitegrast, crystalline form S of lifitegrast, or crystalline form Y of lifitegrast.

Specifically, the crystalline form Z of lifitegrast may be prepared by suspending an ethylene glycol solvate in a suspension solvent, heating for dissolving or stirring at room temperature followed by cooling, and then filtering and drying under reduced pressure. At this time, as the suspension solvent, ethylene glycol dimethyl ether, 1,2-dimethoxyethane, propionitrile, etc. may be used, and ethylene glycol dimethyl ether is particularly preferred.

Still another embodiment of the present invention relates to a pharmaceutical composition for dry eye syndrome comprising at least one crystalline form or solvate selected from the group consisting of the crystalline form S of lifitegrast, the crystalline form Y of lifitegrast, the ethylene glycol solvate of lifitegrast, and the crystalline form Z of lifitegrast together with a pharmaceutically acceptable carrier.

The pharmaceutical composition of the present invention may further comprise another bioactive substance in addition to the crystalline form or solvate of lifitegrast.

The pharmaceutical composition of the present invention may be orally administered, and be formulated as tablets, capsules, granules, powders, emulsions, suspensions, syrups, etc. The above various forms of the pharmaceutical composition can be prepared in a manner well known in the art using a pharmaceutically acceptable carrier(s) which are usually used for each form. Examples of the pharmaceutically acceptable carriers include excipient, filler, extender, binder, disintegrating agent, lubricant, preservative, antioxidant, isotonic agent, buffer, coating agent, sweetening agent, dissolvent, base, dispersing agent, wetting agent, suspending agent, stabilizer, colorant, flavoring agent, etc.

In the preparation of the medicament, the content of the crystalline form or solvate of lifitegrast is, depending on the form thereof, preferably 10 to 90 wt %, more preferably 30 to 80 wt %.

The specific dosage of the present pharmaceutical composition can be varied with species of mammals including a human-being, administration route, body weight, gender, age, severity of disease, judgment of doctor, etc. In general, in the case of oral administration, the dosage of the active ingredient may be about 1 to 240 mg, preferably 5 to 180 mg, and more preferably 10 to 120 mg per day for a general adult weighing about 60 kg. The total daily dosage can be administered once or over several times depending on the severity of disease, judgment of doctor, etc.

Advantageous Effects

The crystalline forms S, Y and Z of lifitegrast or the ethylene glycol solvate of lifitegrast according to the present invention can exhibit excellent bioavailability when formulated due to improved solubility. Further, the crystalline forms S, Y and Z of lifitegrast or the ethylene glycol solvate of lifitegrast according to the present invention have excellent stability against heat and moisture, so that the generation of related substances can be suppressed in a formulation containing the same, and raw material storage and preparation process are convenient and safe due to low hygroscopicity.

BRIEF DESCRIPTION OF THE DRAWINGS

FIG. 1 is an X-ray powder diffraction (XRPD) pattern of the crystalline form S of lifitegrast.

FIG. 2 is an X-ray powder diffraction (XRPD) pattern of the crystalline form Y of lifitegrast.

FIG. 3 is an X-ray powder diffraction (XRPD) pattern of the ethylene glycol solvate of lifitegrast.

FIG. 4 is an X-ray powder diffraction (XRPD) pattern of the crystalline form Z of lifitegrast.

FIG. 5 is a differential scanning calorimetry (DSC) thermogram of the crystalline form S of lifitegrast.

FIG. 6 is a differential scanning calorimetry (DSC) thermogram of the crystalline form Y of lifitegrast.

FIG. 7 is a differential scanning calorimetry (DSC) thermogram of the ethylene glycol solvate of lifitegrast.

FIG. 8 is a differential scanning calorimetry (DSC) thermogram of the crystalline form Z of lifitegrast.

FIG. 9 is a thermogravimetric analysis (TGA) diagram of the crystalline form S of lifitegrast.

FIG. 10 is a thermogravimetric analysis (TGA) diagram of the crystalline form Y of lifitegrast.

FIG. 11 is a thermogravimetric analysis (TGA) diagram of the ethylene glycol solvate of lifitegrast.

FIG. 12 is a thermogravimetric analysis (TGA) diagram of the crystalline form Z of lifitegrast.

FIG. 13 is a dynamic vapor adsorption/desorption (DVS) curve of the crystalline form S of lifitegrast.

FIG. 14 is a dynamic vapor adsorption/desorption (DVS) curve of the crystalline form Y of lifitegrast.

FIG. 15 is a graph showing the results of measuring the solubility of the crystalline forms A, S and Y of lifitegrast.

BEST MODE

The present invention is further illustrated by the following examples, which are not to be construed to limit the scope of the invention.

Comparative Example 1: Preparation of Amorphous Lifitegrast (S)-methyl-2-(2-(benzofuran-6-carbonyl)-5,7-dichloro-1,2,3,4-tetrahydroisoquinoline-6-carboxamido)-3-(3-(methylsulfonyl)phenyl)propinate (1 g, 1.589 mmol) was suspended in tetrahydrofuran (5 mL, 5 v/w) and cooled to 0° C. 1 M LiOH aqueous solution (1.75 mL, 1.747 mmol) was slowly added dropwise to the reaction solution while maintaining 5° C. or less, followed by stirring at 0° C. for 2 hours. After confirming the termination of the reaction by HPLC, the resulting solution was warmed to room temperature. The resulting solution was concentrated, and water (5 mL, 5 v/w), saturated $NaHCO_3$ aqueous solution (1 mL, 1 v/w) and ethyl acetate (3 mL, 3 v/w) were added dropwise, followed by stirring and washing for 30 minutes. The aqueous layer was separated and washed once again with ethyl acetate (3 mL, 3 v/w), followed by separating and removing the organic layer. Concentration was carried out to remove the organic layer remaining in the aqueous layer. Acidification and solidification were carried out by slowly adding dropwise 37% HCl aqueous solution (3 mL, 3 v/w) to the aqueous layer while stirring rapidly. When pH was decreased to 1 or less, filtering was carried out and the filtered solid was washed with water (2 mL, 2 v/w). The obtained solid was dried under vacuum for 12 hours or more to give the compound of formula (1) (0.83 g, 1.351 mmol, yield: 85%, purity: 98.5%) as a white amorphous solid.

Example 1: Preparation of Crystalline Form S of Lifitegrast

The amorphous lifitegrast (1.0 g) obtained from Comparative Example 1 was suspended in ethanol (10 mL), followed by heating and stirring. The resulting solution was cooled to room temperature and stirred for 1 day or more. After the obtained solid was filtered, it was washed with ethanol and water, respectively, to give lifitegrast having the purity of 99.8% (0.80 g). The obtained solid was subjected to X-ray powder diffraction (XRPD) analysis, differential scanning calorimetry (DSC), and thermogravimetric analysis (TGA). The results are shown in Table 1, FIG. 1, FIG. 5, and FIG. 9, and the solid was referred to as crystalline form S of lifitegrast.

Endothermic peak (differential scanning calorimetry, DSC): 57.0° C. and 164.3° C.

TABLE 1

| No. | 2θ | relative intensity (%) |
|---|---|---|
| 1 | 9.849 | 11.8 |
| 2 | 10.868 | 100 |
| 3 | 12.213 | 7.1 |
| 4 | 15.360 | 7.7 |
| 5 | 16.546 | 38.3 |
| 6 | 18.043 | 55.2 |
| 7 | 19.529 | 14.8 |
| 8 | 20.165 | 83.2 |
| 9 | 20.882 | 47.9 |
| 10 | 21.790 | 37.7 |
| 11 | 22.881 | 79.5 |
| 12 | 23.709 | 32.8 |
| 13 | 24.318 | 17.9 |
| 14 | 24.391 | 25.7 |
| 15 | 24.920 | 30.1 |
| 16 | 26.041 | 54.2 |
| 17 | 28.213 | 9.4 |
| 18 | 29.708 | 19.1 |
| 19 | 30.607 | 3.7 |
| 20 | 32.221 | 8.1 |
| 21 | 32.219 | 8.2 |
| 22 | 34.167 | 4.9 |
| 23 | 34.759 | 3.3 |
| 24 | 35.286 | 7.7 |
| 25 | 38.903 | 5.6 |

Example 2: Preparation of Crystalline Form Y of Lifitegrast (S)-methyl-2-(2-(benzofuran-6-carbonyl)-5,7-dichloro-1,2,3,4-tetrahydroisoquinoline-6-carboxamido)-3-(3-(methylsulfonyl)phenyl)propinate (1 g, 1.589 mmol) was suspended in tetrahydrofuran (5 mL, 5 v/w) and cooled to 0° C. 1 M LiOH aqueous solution (1.75 mL, 1.747 mmol) was slowly added dropwise to the reaction solution while maintaining 5° C. or less, followed by stirring at 0° C. for 2 hours. After confirming the termination of the reaction by HPLC, the resulting solution was warmed to room temperature. The resulting solution was concentrated, and water (5 mL, 5 v/w), saturated NaHCO$_3$ aqueous solution (1 mL, 1 v/w) and ethyl acetate (3 mL, 3 v/w) were added dropwise, followed by stirring and washing for 30 minutes. The aqueous layer was separated and washed once again with ethyl acetate (3 mL, 3 v/w), followed by separating and removing the organic layer. Concentration was carried out to remove the organic layer remaining in the aqueous layer. Acidification and solidification were carried out by slowly adding dropwise 37% HCl aqueous solution (3 mL, 3 v/w) to the aqueous layer while stirring rapidly. When pH was decreased to 1 or less, dichloromethane (10 mL, 10 v/w) was slowly added dropwise thereto, followed by stirring for 30 minutes. The organic layer was separated and concentrated, and the resulting solution was azeotroped with ethanol (2 v/w) which is used as a recrystallization solvent. The resulting solution was heated to 80° C. and stirred until dissolved, followed by cooling slowly to room temperature. After cooling to room temperature, ethanol was additionally added and stirred, followed by filtering the obtained solid. The filtered solid was washed with ethanol and water, respectively. Before drying, the obtained solid was confirmed as crystalline form S by an X-ray powder diffraction (XRPD) analysis. The obtained solid was dried under vacuum at 70° C. for 12 hours or more to give a solid (purity: 99.8%), which was subjected to X-ray powder diffraction (XRPD) analysis, differential scanning calorimetry (DSC), and thermogravimetric analysis (TGA). The results are shown in Table 2, FIG. 2, FIG. 6, and FIG. 10, and the solid was referred to as crystalline form Y of lifitegrast.

Endothermic peak (differential scanning calorimetry, DSC): 162.2° C.

TABLE 2

| No. | 2θ | relative intensity (%) |
|---|---|---|
| 1 | 10.194 | 50.7 |
| 2 | 10.805 | 68.4 |
| 3 | 11.925 | 2.9 |
| 4 | 16.125 | 2.8 |
| 5 | 16.630 | 28.5 |
| 6 | 17.050 | 13.2 |
| 7 | 18.144 | 25.5 |
| 8 | 18.357 | 50.1 |
| 9 | 18.892 | 19.2 |
| 10 | 20.265 | 45.7 |
| 11 | 20.493 | 100 |
| 12 | 20.967 | 31.3 |
| 13 | 21.631 | 25.8 |
| 14 | 22.353 | 7.9 |
| 15 | 22.771 | 44.9 |
| 16 | 23.594 | 29.5 |
| 17 | 24.039 | 18.1 |
| 18 | 24.041 | 18.5 |
| 19 | 24.898 | 15.8 |
| 20 | 25.919 | 41.7 |
| 21 | 26.535 | 13.3 |
| 22 | 28.226 | 19.0 |
| 23 | 29.254 | 24.4 |
| 24 | 30.845 | 8.2 |
| 25 | 31.524 | 3.0 |
| 26 | 34.421 | 6.0 |
| 27 | 35.392 | 7.6 |
| 28 | 36.449 | 3.7 |
| 29 | 36.458 | 3.3 |
| 30 | 39.726 | 5.6 |

Example 3: Preparation of Crystalline Form S of Lifitegrast

The crystalline form Y of lifitegrast obtained from Example 2 was stored at 25° C. and a relative humidity of 60% for 12 hours or more to give crystalline form S of lifitegrast.

Example 4: Preparation of Crystalline Form Y of Lifitegrast

The crystalline form S of lifitegrast obtained from Example 1 was dried under vacuum at 70° C. for 1 day or more to give crystalline form Y of lifitegrast.

Example 5: Preparation of Ethylene Glycol Solvate of Lifitegrast

The amorphous lifitegrast (1.0 g) obtained from Comparative Example 1 was dissolved in ethylene glycol (10 mL), followed by stirring at room temperature for about 24 hours. The obtained solid was filtered and was washed with ethylene glycol (3 mL, 3 v/w). The obtained solid was dried under vacuum at 70° C. for 12 hours or more to give an ethylene glycol solvate of lifitegrast (0.83 g) having the purity of 99.7%. The obtained solid was subjected to X-ray powder diffraction (XRPD) analysis, differential scanning calorimetry (DSC), and thermogravimetric analysis (TGA). The results are shown in Table 3, FIG. 3, FIG. 7, and FIG. 11.

Endothermic peak (differential scanning calorimetry, DSC): 144.5° C.

TABLE 3

| No. | 2θ | relative intensity (%) |
|---|---|---|
| 1 | 6.702 | 0.4 |
| 2 | 8.606 | 4.1 |
| 3 | 9.708 | 16.5 |
| 4 | 11.588 | 0.8 |
| 5 | 12.560 | 24.5 |
| 6 | 13.893 | 1.4 |
| 7 | 16.242 | 3.4 |
| 8 | 17.109 | 2.1 |
| 9 | 17.946 | 5.8 |
| 10 | 18.023 | 5.2 |
| 11 | 18.718 | 11.7 |
| 12 | 19.891 | 5.7 |
| 13 | 20.847 | 13.9 |
| 14 | 21.585 | 100 |
| 15 | 22.216 | 8.8 |
| 16 | 22.713 | 2.3 |
| 17 | 23.381 | 14.0 |
| 18 | 24.066 | 10.6 |
| 19 | 24.760 | 2.5 |
| 20 | 25.483 | 6.0 |
| 21 | 25.838 | 7.7 |
| 22 | 26.248 | 3.1 |
| 23 | 27.046 | 0.8 |
| 24 | 28.093 | 2.7 |
| 25 | 28.993 | 8.4 |
| 26 | 34.119 | 1.9 |
| 27 | 35.641 | 1.0 |
| 28 | 36.264 | 3.1 |
| 29 | 37.879 | 2.2 |
| 30 | 38.871 | 5.3 |

Example 6: Preparation of Crystalline Form Y of Lifitegrast

The ethylene glycol solvate of lifitegrast (1.0 g) obtained from Example 5 was suspended in water (10 mL, 10 v/w), followed by stirring at room temperature for 12 hours or more. After sufficient stirring, the resultant was filtered and washed with water (3 mL, 3 v/w). The obtained solid was dried under vacuum at 70° C. for 1 day or more to give crystalline form Y of lifitegrast (0.92 g) having the purity of 99% or more.

Example 7: Preparation of Crystalline Form Y of Lifitegrast

The ethylene glycol solvate of lifitegrast (1.0 g) obtained from Example 5 was suspended in ethanol (10 mL, 10 v/w), followed by stirring at room temperature for 12 hours or more. After sufficient stirring, the resultant was filtered and washed with ethanol (3 mL, 3 v/w). The obtained solid was dried under vacuum at 70° C. for 1 day or more to give crystalline form Y of lifitegrast (0.89 g) having the purity of 99% or more.

Example 8: Preparation of Crystalline Form Y of Lifitegrast

The ethylene glycol solvate of lifitegrast (1.0 g) obtained from Example 5 was suspended in acetone (10 mL, 10 v/w), followed by stirring at room temperature for 12 hours or more. After sufficient stirring, the resultant was filtered and washed with acetone (3 mL, 3 v/w). The obtained solid was dried under vacuum at 70° C. for 1 day or more to give crystalline form Y of lifitegrast (0.88 g) having the purity of 99% or more.

Example 9: Preparation of Crystalline Form Z of Lifitegrast

The amorphous lifitegrast (1.0 g) obtained from Comparative Example 1 was suspended in ethylene glycol dimethyl ether (8 mL, 8 v/w), followed by heating for dissolving or stirring at room temperature. The resulting solution was cooled and filtered, followed by washing with ethylene glycol dimethyl ether (2 mL, 2 v/w). The obtained solid was dried under vacuum at 70° C. for 12 hours or more. The dried solid was subjected to X-ray powder diffraction (XRPD) analysis, differential scanning calorimetry (DSC), and thermogravimetric analysis (TGA). The results are shown in Table 4, FIG. 4, FIG. 8, and FIG. 12, and the solid was referred to as crystalline form Z of lifitegrast.

Endothermic peak (differential scanning calorimetry, DSC): 162.3° C.

TABLE 4

| No. | 2θ | relative intensity (%) |
|---|---|---|
| 1 | 7.484 | 24.4 |
| 2 | 8.100 | 22.3 |
| 3 | 8.672 | 29.7 |
| 4 | 9.765 | 39.8 |
| 5 | 10.151 | 68.7 |
| 6 | 12.477 | 84.2 |
| 7 | 17.466 | 97.4 |
| 8 | 18.265 | 99.3 |
| 9 | 18.619 | 43.0 |
| 10 | 19.017 | 50.1 |
| 11 | 20.342 | 71.6 |
| 12 | 21.135 | 20.5 |
| 13 | 21.535 | 48.2 |
| 14 | 21.873 | 93.8 |
| 15 | 22.204 | 71.8 |
| 16 | 22.905 | 21.1 |
| 17 | 23.769 | 29.1 |
| 18 | 24.344 | 22.8 |
| 19 | 24.768 | 100 |
| 20 | 25.599 | 27.6 |
| 21 | 26.412 | 21.3 |
| 22 | 26.973 | 23.3 |
| 23 | 28.459 | 60.6 |
| 24 | 34.777 | 15.7 |

Example 10: Preparation of Crystalline Form Z of Lifitegrast

The amorphous lifitegrast (1.0 g) obtained from Comparative Example 1 was suspended in 1,2-dimethoxyethane (10 mL, 10 v/w), followed by heating for dissolving or stirring at room temperature. The resulting solution was cooled and filtered, followed by washing with 1,2-dimethoxyethane (2 mL, 2 v/w). The obtained solid was dried under vacuum at 70° C. for 12 hours or more to give crystalline form Z of lifitegrast (0.77 g) having the purity of 99.7%.

Example 11: Preparation of Crystalline Form Z of Lifitegrast

The amorphous lifitegrast (1.0 g) obtained from Comparative Example 1 was suspended in propionitrile (8 mL, 8 v/w), followed by heating for dissolving or stirring at room temperature. The resulting solution was cooled and filtered, followed by washing with propionitrile (2 mL, 2 v/w). The obtained solid was dried under vacuum at 70° C. for 12 hours or more to give crystalline form Z of lifitegrast (0.64 g) having the purity of 99.7%.

Comparative Example 2: Preparation of Crystalline Form A of Lifitegrast

Crystalline form A of lifitegrast (purity: 99.6%) was obtained according to the process described in U.S. Pat. No. 8,367,701.

X-Ray Powder Diffraction (XRPD) Analysis

X-ray powder diffraction (XRPD) analysis was performed using an X-Ray powder diffractometer to obtain a diffraction pattern in a range of 3~40° 2θ. The conditions of the X-ray powder diffraction analysis are as follows.

Device: Bruker A26X1 D2 Phaser

Time per step: 0.5 s

Scanning method: Continuous PSD fast

Detector: Lynxeye (1D mode)

Differential Scanning Calorimetry (DSC)

Differential scanning calorimetry (DSC) was performed using a Q2000 model of TA instrument. About 2-3 mg of the sample was put in an aluminum pan and covered with a perforated lid to prepare a sample required for the DSC experiment. The exact weight was recorded, followed by heating to 25-250° C. at a rate of 10° C./min under nitrogen.

Thermogravimetric Analysis (TGA)

Thermogravimetric analysis (TGA) was performed using a Q50 model of TA instrument. About 10 mg of the sample was put in a platinum pan to prepare a sample required for the TGA experiment. Heating was carried out to 25-600° C. at a rate of 10° C. under nitrogen.

Experimental Example 1: Thermal Stability Test 50 mg of crystalline form Y and 50 mg of crystalline form S obtained from the Examples were put into brown vials, respectively, and secondary packaging was carried out in an aluminum pouch, followed by storing at 40±2° C. and 75±5% RH. After 4 weeks, each sample was taken out, X-ray powder diffraction (XRPD) analysis was performed to evaluate the stability of the crystalline form, and high performance liquid chromatography (HPLC) analysis was performed to evaluate the generation and increase of related substances.

The results of the X-ray powder diffraction (XRPD) analysis and high performance liquid chromatography (HPLC) analysis are shown in Table 5 and 6, respectively.

TABLE 5

| Time | 40° C./75% RH | |
|---|---|---|
| (weeks) | Crystalline Form Y | Crystalline Form S |
| 4 | Retention of Crystalline Form | Retention of Crystalline Form |

TABLE 6

| Time | 40° C./75% RH | |
|---|---|---|
| (weeks) | Crystalline Form Y | Crystalline Form S |
| 4 | No generation of Related substance | No generation of Related substance |

As shown in Tables 5 and 6, crystalline forms Y and S did not change in appearance and polymorphism at 40° C./75% RH for 4 weeks, and no related substance was observed.

Therefore, it was confirmed that the novel crystalline forms of lifitegrast, crystalline forms Y and S are stable against heat and moisture.

Experimental Example 2: Hygroscopicity Test

Using a DVS (dynamic vapor absorption, VTI SGA-100, TA Instruments) which is a vapor adsorption and desorption device, crystalline forms Y and S of lifitegrast obtained from the Examples and crystalline form A of lifitegrast obtained from the Comparative Example were subjected to moisture adsorption and desorption once repeatedly, respectively, at an isothermal condition of 25° C. and in a relative humidity range of 5-95% with an interval of 5% RH. The results are shown in Table 7, FIG. 13 and FIG. 14.

TABLE 7

| Crystalline Form | Moisture Absorption at 25° C./80% RH |
|---|---|
| Crystalline Form A | 1.0% |
| Crystalline Form Y | 2.9% |
| Crystalline Form S | 0.1% |

As a result of the DVS analysis, it was confirmed that the crystalline forms Y and S exhibited low hygroscopicity. In particular, the crystalline form S exhibited lower hygroscopicity than the crystalline form A according to the EP standard (25° C., relative humidity of 80%).

Therefore, through the above thermal stability test and hygroscopicity test, it was confirmed that the crystalline form S is the most stable. Further, since the crystalline form S has excellent stability against moisture, the generation of related substances to moisture can be suppressed in a formulation containing it, so that the stability of the lifitegrast formulation can be greatly improved, and the raw material storage and manufacturing process can be convenient and safe.

Experimental Example 3: Solubility Test

After crystalline forms Y and S of lifitegrast obtained from the Examples and crystalline form A of lifitegrast obtained from the Comparative Example were dissolved in water, respectively, they were sufficiently stirred at room temperature to perform a solubility test. The results are shown in Table 8 and FIG. 15.

TABLE 8

| Crystalline Form | Solubility in water (mg/mL) |
|---|---|
| Crystalline Form A | 0.032 |
| Crystalline Form Y | 0.067 |
| Crystalline Form S | 0.064 |

As shown in Table 8, it can be confirmed that the solubilities of the crystalline forms Y and S of lifitegrast are twice or more as compared with that of the crystalline form A.

Therefore, it can be confirmed that the crystalline forms Y and S are crystalline forms which improved solubility of lifitegrast, which is a poorly soluble drug, and can exhibit better bioavailability than crystalline form A when formulated.

The invention claimed is:

1. Crystalline form S of lifitegrast showing an X-ray powder diffraction (XRPD) pattern characterized by peaks having $I/I_o$ values of at least 10% (I is the intensity of each peak; Io is the intensity of the highest peak) at diffraction angles (2θ) of 9.8=0.2, 10.9±0.2, 16.5±0.2, 18.0±0.2, 19.5=0.2, 20.2±0.2, 20.9±0.2, 21.8±0.2, 22.9±0.2, 23.7±0.2, 24.3±0.2, 24.4±0.2, 24.9±0.2, 26.0±0.2, and 29.7±0.2.

2. The crystalline form S of lifitegrast according to claim 1, which shows a first endothermic peak at 57.0° C. and a second endothermic peak at 164.3° C. in differential scanning calorimetry.

3. Crystalline form Y of lifitegrast showing an X-ray powder diffraction (XRPD) pattern characterized by peaks having $I/I_o$ values of at least 10% (I is the intensity of each peak; $I_o$ is the intensity of the highest peak) at diffraction angles (2θ) of 10.2±0.2, 10.8±0.2, 16.6±0.2, 17.1±0.2, 18.1±0.2, 18.4±0.2, 18.9±0.2, 20.3±0.2, 20.5±0.2, 21.0±0.2, 21.6±0.2, 22.8±0.2, 23.6±0.2, 24.0±0.2, 24.9±0.2, 25.9±0.2, 26.5±0.2, 28.2±0.2, and 29.3±0.2.

4. The crystalline form Y of lifitegrast according to claim 3, which shows an endothermic peak at 162.2° C. in differential scanning calorimetry.

5. An ethylene glycol solvate of lifitegrast showing an X-ray powder diffraction (XRPD) pattern characterized by peaks having $I/I_o$ values of at least 10% (I is the intensity of each peak; $I_o$ is the intensity of the highest peak) at diffraction angles (2θ) of 9.7±0.2, 12.6±0.2, 18.7±0.2, 20.8±0.2, 21.6±0.2, 23.4±0.2, and 24.1±0.2.

6. The ethylene glycol solvate of lifitegrast according to claim 5, which shows an endothermic peak at 144.5° C. in differential scanning calorimetry.

7. Crystalline form Z of lifitegrast showing an X-ray powder diffraction (XRPD) pattern characterized by peaks having $I/I_o$ values of at least 10% (I is the intensity of each peak; $I_o$ is the intensity of the highest peak) at diffraction angles (2θ) of 7.5±0.2, 8.1±0.2, 8.7±0.2, 9.8±0.2, 10.2±0.2, 12.5±0.2, 17.5±0.2, 18.3±0.2, 18.6±0.2, 19.0±0.2, 20.3±0.2, 21.1±0.2, 21.5±0.2, 21.9±0.2, 22.2±0.2, 22.9±0.2, 23.8±0.2, 24.3±0.2, 24.8±0.2, 25.6±0.2, 26.4±0.2, 27.0±0.2, 28.5±0.2, and 34.8±0.2.

8. The crystalline form Z of lifitegrast according to claim 7, which shows an endothermic peak at 162.3° C. in differential scanning calorimetry.

9. A pharmaceutical composition comprising the crystalline form S of lifitegrast according to claim 1 and a pharmaceutically acceptable carrier.

10. A pharmaceutical composition comprising the crystalline form Y of lifitegrast according to claim 3, and a pharmaceutically acceptable carrier.

11. A pharmaceutical composition comprising the ethylene glycol solvate of lifitegrast according to claim 5, and a pharmaceutically acceptable carrier.

12. A pharmaceutical composition comprising the crystalline form Z of lifitegrast according to claim 7, and a pharmaceutically acceptable carrier.

* * * * *